T. JACOBSON.
ANTIFRICTION BEARING.
APPLICATION FILED MAY 22, 1919.
1,343,321. Patented June 15, 1920.
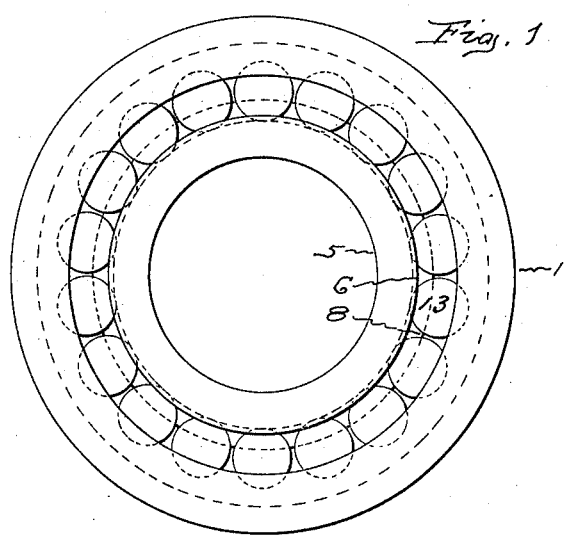
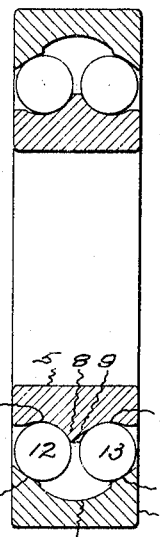
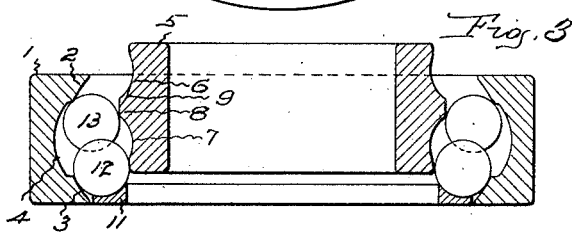
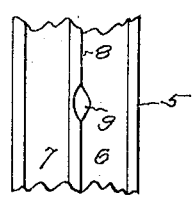
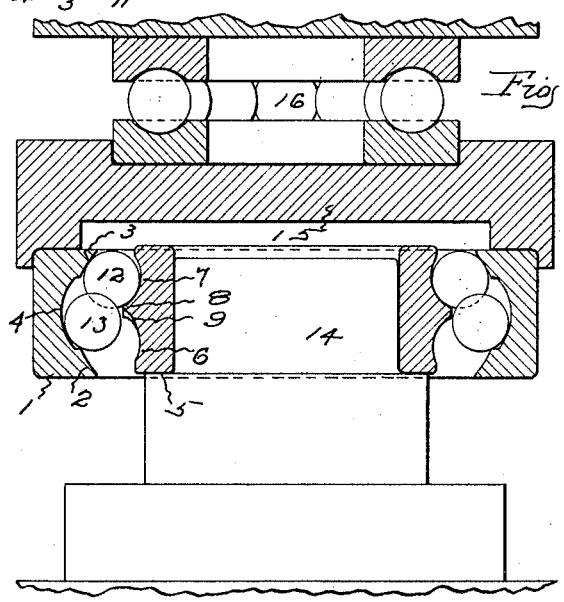
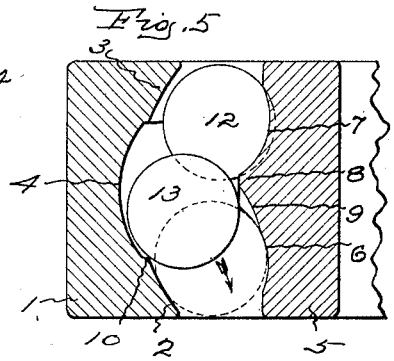
Inventor
Theodore Jacobson by
Harry P. Williams
atty.

UNITED STATES PATENT OFFICE.

THEODORE JACOBSON, OF HARTFORD, CONNECTICUT.

ANTIFRICTION-BEARING.

1,343,321.　　　　　Specification of Letters Patent.　　Patented June 15, 1920.

Application filed May 22, 1919. Serial No. 299,008.

*To all whom it may concern:*

Be it known that I, THEODORE JACOBSON, a subject of Sweden, residing at Hartford, in the county of Hartford and State of Connecticut, have invented a new and useful Improvement in Antifriction-Bearings, of which the following is a specification.

This invention relates to an anti-friction bearing which is designed to sustain radial loads and axial thrusts. Such a bearing should have maximum bearing capacity and be capable of sustaining heavy thrust loads in either direction combined with great radial load. It should consist of as few parts as possible, and these parts should be simple and cheap to manufacture and have equal strength and endurance. It should, to an extent, be self-alining and friction be reduced to a minimum. In dimensions it should be interchangeable with other bearings and be so constructed that it can be easily assembled and, if necessary, taken apart without injuring the balls or the races.

The object of this invention is to provide a ball bearing in which these enumerated qualities are inherent.

To attain this end the number and diameter of the balls are made as large as possible and the outer and inner members containing the races between which the balls are arranged are each made of a single piece with the contact points so located that each ball normally is subjected to slightly more radial load than thrust load without any sliding friction and with a very small passage in the interior for the insertion of the balls so as not to weaken the member in which this passage is made or break up the bearing surfaces, with the radius of the races in the outer member made much larger than the radius of the races in the inner member, so that when these members are assembled, with very slight looseness, there is sufficient play to afford the desired self-alining.

In the accompanying drawings Figure 1 shows a face view of a bearing which embodies the invention with the parts assembled in position and ready for use. Fig. 2 shows a diametrical section of the bearing. Fig. 3 is a sectional view showing the position of the balls when the bearing is being assembled. Fig. 4 is a sectional view showing the bearing in a later stage of assembly and the means provided for facilitating the assembly. Fig. 5 is a sectional view of a portion of the bearing on larger scale. Fig. 6 is a view looking at a portion of the outer face of the inner member and showing the filling passage formed therein.

The inner wall of the outer annular member 1 is divided into three zones,—the two ball paths 2 and 3 which are formed on a large radius and an intermediate groove 4 which is designed to hold the balls for one of the two races when the bearing is in the process of being assembled. This groove makes the member thinner at the middle but as this section is only exposed to extension there is more than sufficient stock left to insure the proper strength. In the ball paths there is sufficient metal in the member to withstand the load.

The outer face of the inner annular member 5 has two grooves 6 and 7 formed on a radius that is somewhat shorter than the radius of the ball paths 2 and 3. Between the races on the exterior of the inner annular member is a central ridge 8, at one point in which the edge is cut away to form a passage for inserting the balls from one side. This passage is ground circular on a radius having a center which is located at either one or the other outer edge 10 of the center groove of the outer member, the radius preferably being a few thousandths of an inch longer than the ball diameter in order to allow the balls to easily slip through. This passage is very small and does not extend down to the bottom of the groove and thus interrupt the race-way as is usually the case with bearings having filling openings in the side.

After these members have been ground, polished and matched the outer member is laid on a table and a temporary filling ring 11 is inserted into one side of the outer member. First one row of balls 12 is put in so as to rest upon the ring and against the wall of the outer member. Then the second row of balls 13 is placed in position, each of these balls resting on two of the balls in the lower row and resting against the wall of the center groove in the outer member. The filling ring should be so thick that the balls are raised high enough to allow the edge of the inner member, which is then inserted, to pass the lower row of balls and the central ridge on the inner member to pass the upper row of balls, as shown in Fig. 3.

After the inner member has been inserted the bearing is turned over and mounted on a shouldered arbor 14, the upper end of which is ground to fit the bore of the inner member. A flanged plate 15 carrying a thrust bearing 16 is then placed on top of the outer member and the whole set in a press, Fig. 4. Some pressure is then applied, and the outer member together with the plate which bears upon it and the lower race of the thrust bearing, are rotated by hand. When a ball of the lower row comes over the filling passage it drops by its own weight into final position. The pressure applied under no consideration must be greater than the maximum thrust load allowed for the particular bearing, in order to prevent the races from being dented. The length of the radius on which the filling passage is cut should be chosen so that allowing for the compression of the balls together with the looseness of the bearing, which in a bearing of the size illustrated is very slight, there will be only sufficient space for the balls to pass through and drop down.

The ball spacer is not illustrated and described herein because it forms no part of the invention and has nothing to do with the construction of the bearing and the assembling of the parts.

The invention claimed is:—

1. An anti-friction bearing comprising an annular outer member having on its interior wall two ball paths and an intermediate groove, an annular inner member having on its exterior wall two ball grooves and an intermediate ridge, said ridge at one locality being cut away on one side to form a ball filling passage, and rows of balls located between the ball paths on the outer member and the grooves on the inner member.

2. An anti-friction bearing comprising an annular outer member having on its interior wall two ball paths and an intermediate groove, an annular inner member having on its exterior wall two ball grooves and an intermediate ridge, the edge of said ridge at one locality being cut away on a curve the center of which is at one end of one of the ball paths on the outer member and the radius of which is substantially the diameter of the balls, and rows of balls located between the ball paths on the outer member and the grooves on the inner member.

3. An anti-friction bearing comprising an annular outer member having on its interior wall two curved ball paths and an intermediate groove, an annular inner member having on its exterior wall two ball grooves and an intermediate ridge, the radius of curvature of said grooves being less than the radius of curvature of said ball paths, a ridge intermediate said grooves, said ridge at one locality being cut away from one side on a curve the center of which is substantially at the inner edge of one of the ball paths in the outer member, and rows of balls located between the ball paths on the outer member and grooves on the inner member.

4. An anti-friction bearing comprising an annular outer member formed in one piece and having on its interior wall two conoidal ball paths, an annular inner member having on its exterior wall two ball grooves with an intermediate ridge, said ridge at one point being cut away on one side to afford passage for balls past the ridge to one ball groove, and rows of balls located between the ball paths on the outer member and the grooves on the inner member.

5. An anti-friction bearing comprising an annular outer member having on its interior wall two ball paths, an annular inner member having on its exterior wall two ball grooves and an intermediate ridge, said ridge at one locality being cut away to provide a ball filling passage, and rows of balls located between the ball paths on the outer member and the grooves on the inner member.

6. An anti-friction bearing comprising an annular outer member having on its interior wall two ball paths, an annular inner member having on its exterior wall two ball grooves and an intermediate ridge, said ridge being cut away on one side to permit the balls to be entered into the groove on said side, and rows of balls located between the ball paths on the outer member and the grooves on the inner member.

THEODORE JACOBSON.